(12) United States Patent
Urlaub

(10) Patent No.: US 6,554,957 B2
(45) Date of Patent: Apr. 29, 2003

(54) SELF ADJUSTING ULTRASONIC WELD FIXTURE

(75) Inventor: Kevin J. Urlaub, Boise, ID (US)

(73) Assignee: Hewlett-Packard Development Company, Palo Alto, CA (US)

( * ) Notice: Subject to any disclaimer, the term of this patent is extended or adjusted under 35 U.S.C. 154(b) by 61 days.

(21) Appl. No.: 09/967,285

(22) Filed: Sep. 28, 2001

(65) Prior Publication Data

US 2003/0062665 A1 Apr. 3, 2003

(51) Int. Cl.[7] .............................................. B29C 65/08
(52) U.S. Cl. .................................. 156/580.1; 156/580.2
(58) Field of Search ................................ 156/73.1, 580, 156/580.1, 580.2, 581, 583.1; 264/442, 443, 445; 425/174.2

(56) References Cited

U.S. PATENT DOCUMENTS

| | | | | |
|---|---|---|---|---|
| 2,371,847 A | * | 3/1945 | Saunders et al. | 156/583.1 X |
| 3,283,052 A | * | 11/1966 | Munk | 156/583.1 X |
| 4,711,693 A | * | 12/1987 | Holze, Jr. | 156/580.1 |
| 5,487,802 A | * | 1/1996 | Mizuta et al. | 156/73.1 |

* cited by examiner

Primary Examiner—James Sells

(57) ABSTRACT

A method and device for accommodating, by self adjustment, for part interface variations. A self adjusting fixture for accommodating for part interface variation includes a part support member having a first self adjusting member engagement element. The self adjusting fixture also includes a pedestal having a second self adjusting member engagement element engaged with the first self adjusting member engagement element to permit axial deflection of the part support member relative to the pedestal.

14 Claims, 4 Drawing Sheets

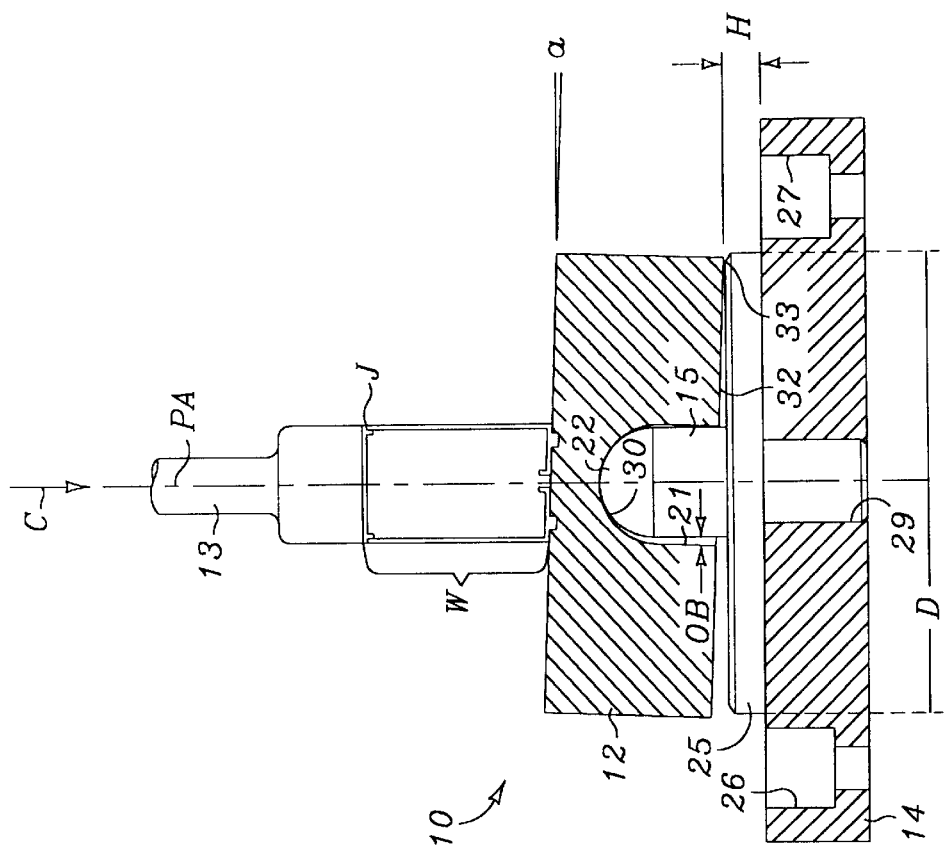
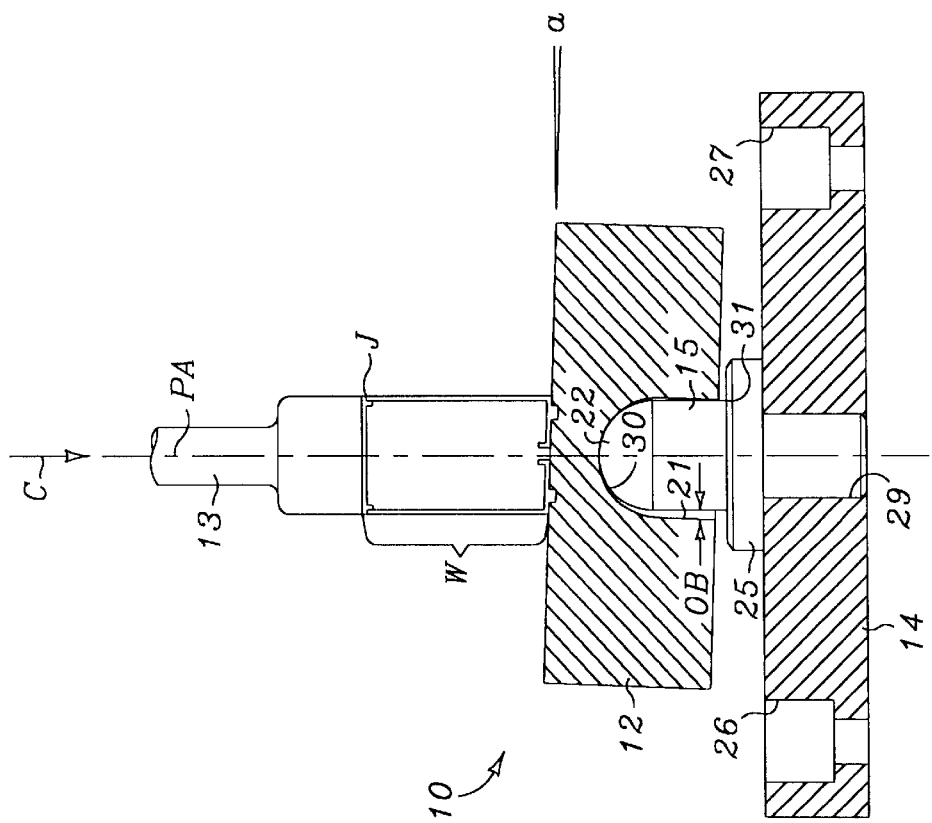

SELF ADJUSTING ULTRASONIC WELD FIXTURE

FIELD OF THE INVENTION

This invention relates generally to manufacturing fixtures and more particularly to a method and device for accommodating variations from acceptable tolerances in the manufacture or configuration of parts to be joined by ultrasonic welding.

BACKGROUND OF THE INVENTION

Ultrasonic welding joins parts by applying mechanical energy from a high frequency vibration source at a joint formed between two parts. Generation of ultrasonic energy includes the conversion of high frequency electrical energy by an electromechanical converter or transducer to a mechanical vibration. Mechanical vibrations are amplified by an amplitude transformer and applied to a workpiece by means of an ultrasonic "horn". The mechanical vibration is produced at a frequency typically in the range of 20,000 (20 kHz) to 40,000 (40 kHz) cycles per second. The high frequency vibration is ordinarily accompanied by a compressive force generated by the horn between the mechanically vibrated part and the relatively stationary part.

During the ultrasonic welding process, the relatively stationary part is typically positioned in a fixture, often referred to as an anvil or nest. The fixture is most often configured to support and conform at least in part to a configuration of the relatively stationary part thereby providing a means to capture the part and eliminate lateral motion during the welding process. Fixtures therefore tend to be part specific. Additionally, the fixture is commonly attached rigidly to a work surface and positioned relative to the ultrasonic horn so as to accommodate positioning of the parts and performance of the welding process.

The vibrated part is mechanically vibrated and compressed against the relatively stationary part joining the parts at an interface. The ultrasonic welding process is capable of breaking down films and oxides creating a coalescence between the parts at the site of the weld. A superior joint may be achieved without the use of filler materials, fluxes, adhesives, epoxies or mechanical connectors.

One parameter deemed critical to the ultrasonic welding process is the fit at the interface between parts. Process parameters often specify acceptable tolerances for fit at the interface between parts to be joined. Due to the part specific nature of the fixture, the rigid attachment of the fixture in the process environment and the process critical relationship of fit and interface between parts to be joined, the ultrasonic welding process may be unforgiving where parts are manufactured even slightly out of tolerance.

There may be advantage in providing a self adjusting fixture for use in an ultrasonic welding process. The self adjusting fixture may accommodate for variations from acceptable tolerances in the manufacture of parts.

SUMMARY

The present invention is directed to a method and device for permitting, by self adjustment, part interface variations. By permitting part interface variations it is meant accommodating variations in the fit at the interface between parts to be joined using an ultrasonic welding process. Variations in the fit at the interface may be caused by variations in the manufacture or configuration of the parts to be joined, or variations in the manufacturing process itself wherein the parts are fit together in preparation for the ultrasonic welding process. In many applications, particularly in those instances where hermetically sealed welds are required, adjustment to fit at the interface of the parts to be joined may result in a desirable improvement.

In one embodiment, the self adjusting fixture for accommodating part interface variation includes a part support member including a first self adjusting member engagement element. The self adjusting fixture also includes a pedestal having a second self adjusting member engagement element engageable with the first self adjusting member engagement element. The self adjusting members permit axial deflection of the nest relative to the pedestal about a primary axis.

In one preferred embodiment of the invention, the self adjusting fixture is configured as an anvil having a nest including a hemispherical socket formed in an underside of the nest. The anvil also includes a pedestal mountable to a base member. The pedestal includes a hemispherical distal end which is sized for insertion within the socket of the nest to permit axial deflection of the nest relative to the pedestal. Preferably, the compressive force exerted during the welding process should lie co-axially to the primary axis and therefore to the axis of axial deflection of the nest relative to the pedestal.

In one preferred embodiment of the invention, axial deflection of the nest relative to the pedestal is limited by a deflection limiting element. The deflection limiting element may include a physical feature of the nest which interacts with a physical feature of the base or the pedestal to limit axial deflection of the nest relative to the pedestal.. The deflection limiting element may include a flat circular element disposed about the pedestal that restricts angular deflection of the nest in three hundred and sixty degrees. Alternately, axial deflection of the nest relative to the pedestal may be limited by a corresponding fit between a shaft of the pedestal and a segment of a wall of the first engagement element.

Rotation of the nest about the axis of deflection relative to the pedestal is limited by a rotation limiting element. The rotation limiting element may include a physical feature of the nest which interacts with a physical feature of the base or the pedestal to limit rotation of the nest about the axis of deflection. In one preferred embodiment of the invention, a pin extends from the nest along an axis substantially perpendicular to the first axis. The pin is captured by a pair of fingers extending from a base member. In the event that rotation of the nest is initiated, such rotation is limited by the pair of fingers.

A method for self adjustment for part interface variations includes the steps of supporting a relatively stationary part including a first interface element on a support member including a self adjusting member first engagement element and a pedestal including a self adjusting member second engagement element axially engaged to the self adjusting member first engagement element, the support member axially deflectable about a first axis, fitting a vibrated part including a second interface element to the first interface element of the relatively stationary part and applying a compressive force between the relatively stationary part and the vibrated part substantially along the first axis for axially deflecting the relatively stationary part with respect to the vibrated part to achieve improved fit between the first interface element and the second interface element.

BRIEF DESCRIPTION OF THE DRAWINGS

FIG. 5 is a representative cross-sectional side view of a self adjusting fixture according to the present invention; and FIG. 6 is a representative cross-sectional side view of a self adjusting fixture according to the present invention.

DETAILED DESCRIPTION OF THE INVENTION

Figure 1:
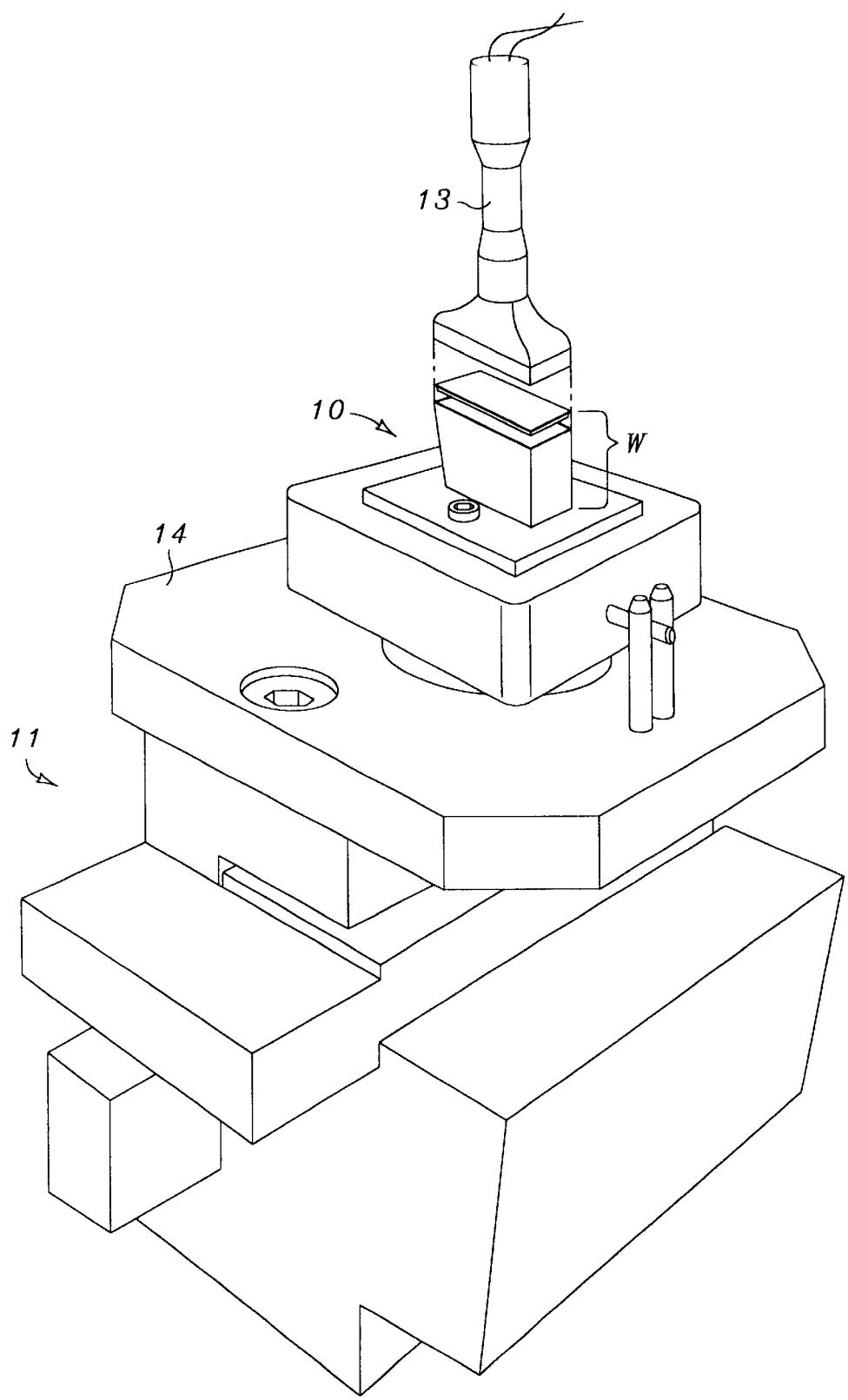
FIG. 1 is a representative perspective view of a self adjusting fixture according to the present invention.

Referring to FIG. 1, self adjusting fixture 10 is shown attached to support structure 11. Workpiece W is positioned on self adjusting fixture 10. Ultrasonic weld horn 13 is shown positioned above workpiece W prior to welding.

Figure 2:
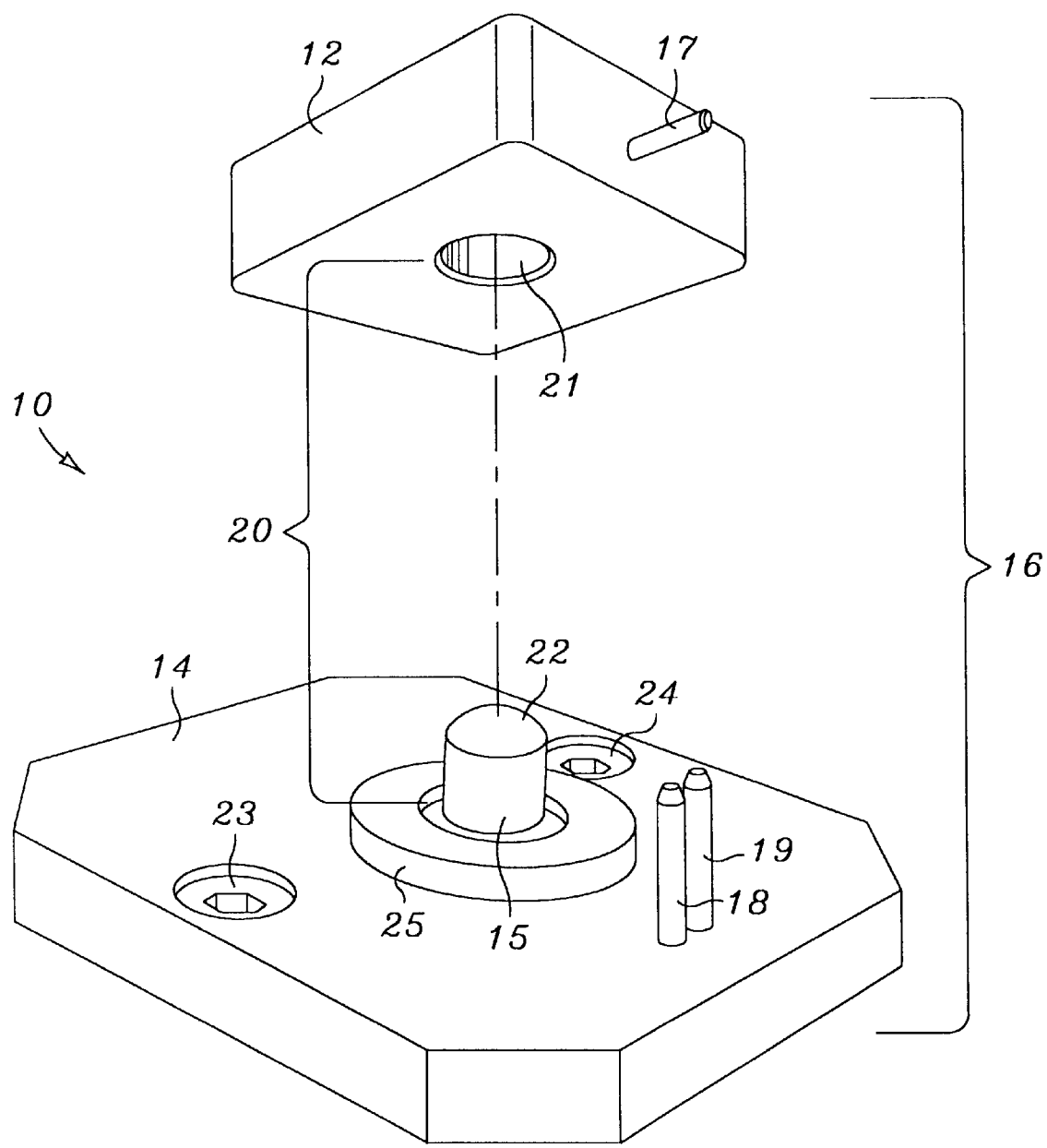
FIG. 2 is a representative exploded perspective view of a self adjusting fixture according to the present invention.

As shown in FIG. 2, self adjusting fixture 10 includes part support member 12 and pedestal 15. Screws 23 and 24 attach mounting plate 14 to support structure 11 (shown in FIG. 1). Raised circular member 25 is positioned about a proximate end of pedestal 15.

FIG. 2 shows a self adjusting member disposed between part support member 12 and mounting plate 14 and includes internal bore 21 formed in support member 12 and pedestal 15, the distal end in this instance being formed as hemispherical solid 22. Also shown to advantage in FIGS. 1 and 2 is a rotation limiting element which includes substantially horizontal pin 17 positioned, (FIG. 1) or positionable, (FIG. 2) between first and second fingers 18 and 19 respectively.

As shown in FIGS. 3 through 6, self adjusting fixture 10 includes part support member 12 and pedestal 15. Pedestal 15 is shown attached to mounting plate 14 by insertion into aperture 29. Mounting plate 14 includes screw holes 26 and 27 through which screws 23 and 24 respectively, (shown in FIGS. 1 and 2), are placed. Part support member 12 includes internal bore 21 terminating at a concave hemispherical socket 30. Pedestal 15 includes a distal end formed as convex hemispherical solid 22. A ball and socket fit is permitted between hemispherical socket 30 and the distal end of pedestal 15 formed as convex hemispherical solid 22.

Figure 4:
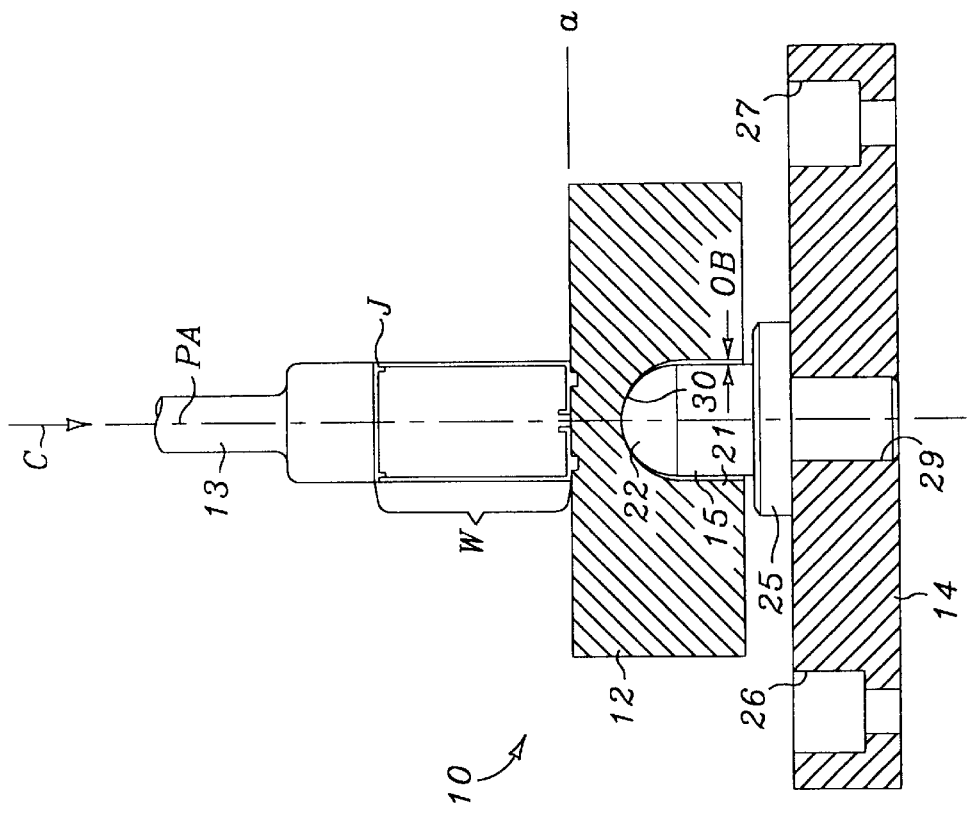
FIG. 4 is a representative side view of the self adjusting fixture according to the present invention.
Figure 3:
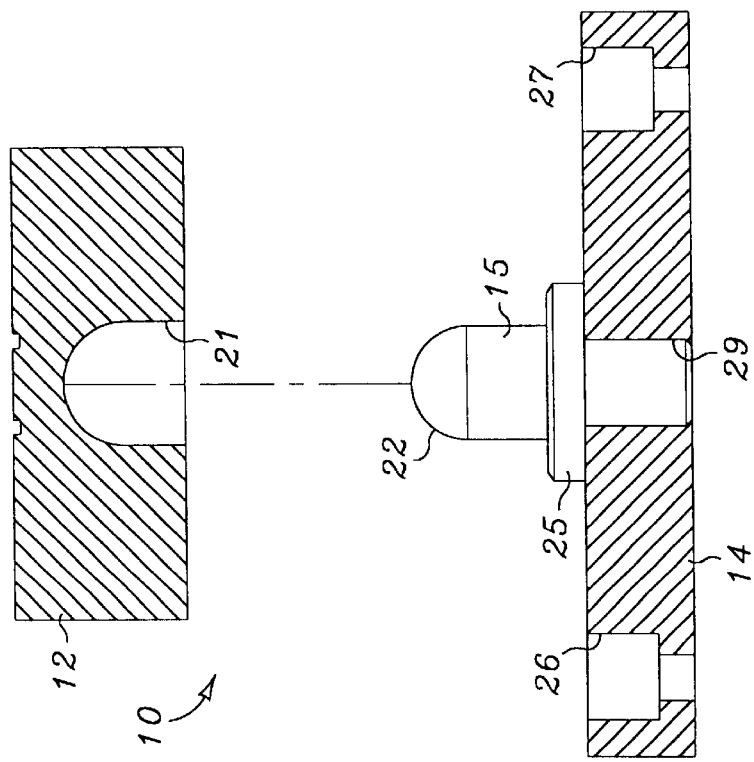
FIG. 3 is a representative exploded side view of the self adjusting fixture according to the present invention.

As shown in FIGS. 4 through 6, weld horn 13 engages an upper member of workpiece W and exerts a compressive force C co-axially to primary axis PA during an ultrasonic welding process. In the preferred instance, the axis of axial deflection of part support member 12 relative to pedestal 15, the axis of the compressive force C and an axis of joint J are all the same.

Engagement of pedestal 15 including convex hemispherical solid 22 with internal bore 21 terminating at hemispherical socket 30 permits a self adjusting feature wherein, in the event that variation exists at joint J of workpiece W, as shown in FIGS. 5 and 6, axial deflection α between part support member 12 and pedestal 15 permits an increased range of acceptable components and alignments resulting in higher production yields.

As shown in FIG. 4, the fit at joint J is within acceptable tolerances and axial deflection α is substantially equal to zero. In FIGS. 5 and 6, however, axial deflection α is greater than zero. Nevertheless, axial deflection α of part support member 12 relative to pedestal 15 serves to accommodate the process permitting joint J to be joined by the ultra sonic welding process.

In FIGS. 4 and 5 an axial deflection limiting member limits axial deflection α of part support member 12 relative to pedestal 15 and is configured as the fit between cylindrical aperture 21 having an over bore diameter OB and a diameter D of pedestal 15 which is calculated to be less than over bore diameter OB but only to the extent that axial deflection α is permitted. Axial deflection α is limited by the interference of a lower circumferential edge 31 of cylindrical aperture 21 with pedestal 15 point 32.

In FIG. 6 an axial deflection limiting member which limits axial deflection α of part support member 12 relative to pedestal 15 is configured as raised circular member 25 positioned about a proximate end of pedestal 15 and having a height H that is calculated to interfere with and limit axial deflection α. Axial deflection α is limited by the interference of a lower surface 32 of part support member 12 with an outer circumferential edge 33 of raised circular member 25.

While the invention has been described with reference to the detailed embodiments, this is not meant to be construed in a limiting sense. Various modifications, changes, variations, substitutions and equivalents to the described embodiment, as well as additional embodiments of the invention, will be apparent to persons skilled in the art upon reference to this description. It is therefore contemplated that the appended claims will cover any and all such modifications or embodiments as fall within the true scope of the invention.

What is claimed is:

1. A self adjusting fixture for supporting a relatively stationary part on a work surface for an ultrasonic welding process, the fixture comprising:

a part support member including a self adjusting member first engagement element; and a pedestal including a self adjusting member second engagement element axially engaged to the self adjusting member first engagement element for allowing axial deflection of the part support member relative to the pedestal.

2. The self adjusting fixture of claim 1 wherein the pedestal further comprises a mounting member mountable to the work surface.

3. The self adjusting fixture of claim 1 further comprising:

a base member; and the pedestal mounted to the base member.

4. The self adjusting fixture of claim 1 further comprising an axial deflection limiting element attached to the pedestal for opposing axial deflection of the part support member.

5. The self adjusting fixture of claim 1 further comprising an axial deflection limiting element attached to the work surface for opposing axial deflection of the part support member.

6. The self adjusting fixture of claim 1 wherein the self adjusting member first engagement element further comprises a substantially concave surface.

7. The self adjusting fixture of claim 1 wherein the self adjusting member first engagement element further comprises a substantially convex surface.

8. The self adjusting fixture of claim 1 wherein the self adjusting member second engagement element further comprises a substantially concave surface.

9. The self adjusting fixture of claim 1 wherein the self adjusting member second engagement element further comprises a substantially convex surface.

10. The self adjusting fixture of claim 1 wherein the self adjusting member first engagement element further comprises a first hemispherical surface.

11. The self adjusting fixture of claim 1 wherein the self adjusting member second engagement element further comprises a second hemispherical surface.

12. The self adjusting fixture of claim 1 wherein the self adjusting member first engagement element further comprises a first conical surface.

13. The self adjusting fixture of claim 1 wherein the self adjusting member second engagement element further comprises a second conical surface.

14. The self adjusting fixture of claim 1 further comprising a rotation limiting element.

* * * * *